(12) United States Patent
Kato

(10) Patent No.: US 7,137,746 B2
(45) Date of Patent: Nov. 21, 2006

(54) OPTICAL TRANSMISSION MODULE AND MANUFACTURING METHOD THEREFOR

(75) Inventor: Masayuki Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/091,859

(22) Filed: Mar. 29, 2005

(65) Prior Publication Data

US 2005/0259927 A1    Nov. 24, 2005

Related U.S. Application Data

(63) Continuation of application No. PCT/JP03/02971, filed on Mar. 13, 2003.

(51) Int. Cl.
*G02B 6/36*    (2006.01)

(52) U.S. Cl. .............................. 385/94; 385/93; 385/88; 385/89; 385/92

(58) Field of Classification Search .................. None
See application file for complete search history.

(56) References Cited

U.S. PATENT DOCUMENTS

| | | | |
|---|---|---|---|
| 6,056,448 A * | 5/2000 | Sauter et al. .................. 385/92 |
| 6,137,929 A | 10/2000 | Rosenberg et al. | |
| 6,243,508 B1 * | 6/2001 | Jewell et al. .................. 385/14 |
| 6,318,909 B1 * | 11/2001 | Giboney et al. .............. 385/90 |
| 6,374,004 B1 * | 4/2002 | Han et al. ...................... 385/14 |
| 6,374,024 B1 | 4/2002 | Iijima | |
| 6,874,952 B1 * | 4/2005 | Nishimura .................... 385/89 |

2002/0085816 A1    7/2002    Nishimura

FOREIGN PATENT DOCUMENTS

| | | |
|---|---|---|
| JP | 4-221912 | 8/1992 |
| JP | 5-121710 | 5/1993 |
| JP | 7-35958 | 2/1995 |
| JP | 9-159882 | 6/1997 |
| JP | 10-126002 | 5/1998 |
| JP | 10-303513 | 11/1998 |
| JP | 11-23805 | 1/1999 |
| JP | 2000-19357 | 1/2000 |
| JP | 2000-138792 | 5/2000 |
| JP | 2000-231040 | 8/2000 |
| JP | 2000-249867 | 9/2000 |
| JP | 2001-21776 | 1/2001 |
| JP | 2001-24213 | 1/2001 |
| JP | 2001-509919 | 7/2001 |
| JP | 2002-202440 | 7/2002 |
| JP | 2002-324941 | 11/2002 |

* cited by examiner

*Primary Examiner*—Frank G. Font
*Assistant Examiner*—Eric Wong
(74) *Attorney, Agent, or Firm*—Westerman, Hattori, Daniels & Adrian, LLP.

(57) ABSTRACT

An optical transceiver module for transmission or receipt of optical signals to and from an external optical path has a frame body having a structure for determining the position thereof relative to the external optical path, a substrate for mounting the optical elements thereon, and a light transmission window having a light guiding structure in light transmission direction in correspondence with the optical elements and the external optical path. The optical elements are formed so as to be sealed by the substrate, frame body, and light transmission window, and the frame body is formed so that the position thereof can be adjusted by fine moving the substrate and the light transmission window.

12 Claims, 6 Drawing Sheets

(a)

(b)

US 7,137,746 B2

OPTICAL TRANSMISSION MODULE AND MANUFACTURING METHOD THEREFOR

This application is a continuation of international application PCT/JP03/02971 filed on Mar. 13, 2003.

TECHNICAL FIELD

The present invention relates to optical wiring, and relates particularly to an optical transmission module for converting an electrical signal to an optical signal or converting an optical signal to an electrical signal, and to a manufacturing method therefor.

BACKGROUND ART

Conventionally, electrical signals have been widely used in data transmission over short distances by computers and the like. In recent years, as the clock frequency of computer central processing units (CPUs) has increased, electrical signals have also come to be used in high frequency bands.

However, delays and noise from electrical wiring and the like have started to become a problem in such data transmission by electrical signals in high frequency bands. As a result, data transmission using light has begun to replace electrical signals. Optical fiber is used as the transmission path in data transmission using light, which is generally divided into multi-mode data transmission over short distances of a few hundred meters or less and single mode data transmission over longer distances of a few hundred kilometers or more. Different optical fibers are also used in multi-mode and single mode transmission: while in multi-mode transmission the diameter of the high refractive index part (hereunder, "the core") ranges from about 50 to 60 µm, in single mode transmission the diameter of the high refractive index part is about 7 µm, or narrower than that of the multi-mode core. A smaller core is used in single mode transmission in order to inhibit the occurrence of modes with differing optical propagation path lengths within the core, so that the waveform of the optical signal will not break down even with long-distance transmission. By contrast, because the transmission distance is shorter in multi-mode transmission the existence of modes with differing propagation path lengths is not so much of a problem.

In such optical transmission, optical transmission modules are used to convert electrical signals to optical signals and optical signals to electrical signals. Optical transmission modules are equipped with light-emitting elements, light-receiving elements or both. Semiconductor laser elements and vertical cavity surface emitting laser (VCSEL) elements in particular are widely used as the aforementioned multi-mode light-emitting elements.

An ordinary commercial optical transmission module is VCSEL module, in which the laser light is focussed by a lens which is an integral part of the sealed window of the vertical cavity surface emitting laser (VCSEL), and optically coupled to optical fiber on the outside.

There has also been an example in which the laser element, drive circuit, photodetector, current-voltage conversion circuit, integrally-formed lens for sealing and the like were integrated into one package as an optical transmission module. Patent Reference 1: Japanese Patent Application Laid-open No. H10-126002

Moreover, there has also been an example of a semiconductor laser module for optical disk recording and reproduction in which the laser element, light-emitting window, case, collimator lens and light-receiving element near the light-emitting window were integrated into a single module. Patent Reference 2: Japanese Patent Application Laid-open No. 10-303513

Moreover, there has also been an example of an optical element module in which a structure (face plate structure) designed to control convergence by means of bundled fibers finer than the optical fibers used in transmission was placed between the optical element and the optical fiber for transmission. In this example, there is no need for the optical element to be aligned with the faceplate or the faceplate with the optical fiber for transmission. Patent Reference 3: Japanese Patent Application Laid-open No. 10-231040

However, because in ordinary commercial optical transmission modules, the light emitted by the VCSEL laser is focussed by a lens, there is a need for alignment in order to achieve optical coupling with an external optical waveguide means, and costs are increased because a structure adapted to the optical module purchased must be separately designed and manufactured. Moreover, commercial modules only emit light and do not have a means for receiving light.

Moreover, in optical transmission modules having a structure in which a semiconductor laser element, a light-receiving element and the like are assembled in a package and sealed with a light-transmitting window which is integrated with a lens, the light-transmitting window cannot be aligned and there is no means of correction if the lens is out of alignment with the laser element.

In addition, a structure has been disclosed for a semiconductor laser for optical disk recording and reproduction in which a light detector or wave front conversion element is formed in combination with the light-transmitting window, which has a seal structure. Moreover, a structure has also been disclosed in which laser light is converted to parallel rays with a collimator lens, the collimator lens is also provided with a reflective surface and the reflected light is received, but both of these only monitor the strength of light emitted by the light source itself.

Moreover, in an optical element module in which a structure (face plate) which controls divergence by means of bundles of fibers finer than optical fibers is placed between the optical element and the optical fiber, the face plate could also be used as the sealing window of the optical element, but there is a problem of increased optical loss because of the existence of dead space between the fine fibers of an optical path composed of bundled fibers. Because in optical wiring the S/N ratio is reduced to the extent that the power of the light source is attenuated, the optical coupling efficiency between the optical element and optical fiber should be as high as possible. Moreover, even when a face plate structure is used it is necessary to align the optical element with the optical fiber for transmission.

Therefore, it is an object of the present invention to provide an optical transmission module capable of providing highly efficient optical coupling between an optical element and an external optical transmission means, wherein the alignment therefor is easy and the external optical transmission means can be easily attached and detached, together with a manufacturing method therefor.

DISCLOSURE OF THE INVENTION

In order to achieve the aforementioned object, one aspect of the present invention is an optical transmission module for data communication by optical signals with an external optical transmission path which has a positioning structure for determining an alignment with an external optical transmission path, a substrate for mounting an optical element, and a light-transmitting window located between the positioning structure and the optical transmission path and having an optical waveguide structure corresponding to the external optical transmission path and to the optical element in a direction of light transmission, and wherein the positioning structure has a substrate mounting part for mounting the substrate and a light-transmitting window mounting part for mounting the light-transmitting window, as well as structures of slightly moving the substrate mounted on the substrate mounting part and the light-transmitting window mounted on the light-transmitting window mounting part so as to adjust their positions relative to the external light transmission path, and wherein the optical element is sealed when the substrate and the light-transmitting window are fixed to the positioning structure.

By the adoption of such a structure an optical transmission module is obtained wherein a substrate with a mounted optical element and a light-transmitting window can be easily and accurately attached to a frame.

EMBODIMENT FOR CARRYING OUT THE INVENTION

Embodiments of the present invention are explained below with reference to drawings. However, the protected scope of the present invention is not limited by these embodiments, and extends to the present invention as it is described in the Claims and to equivalents thereof.

(Embodiment 1)

Figure 1:
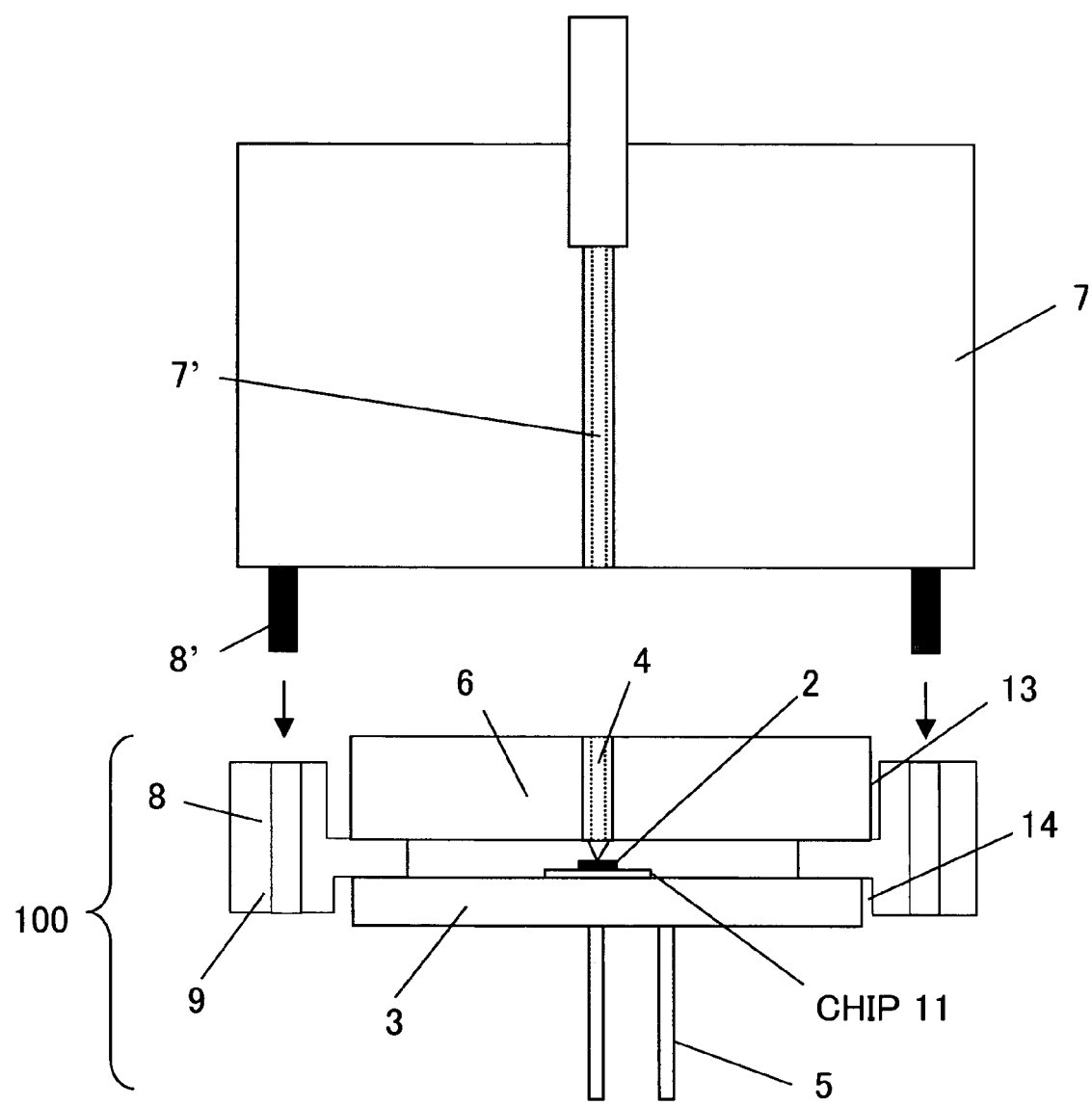
FIG. 1 is a cross-section of an optical transmission module illustrating the first example of the present invention.

FIG. 1 is a cross-section of an optical transmission module illustrating the first embodiment of the present invention. Substrate 3 on which is mounted chip 11 having surface emitting element 2 for example as the optical element and light-transmitting window 6 having optical fibers for example embedded as waveguide structure 4 in the direction of light transmission are fixed with a highly airtight adhesive or the like (not shown) to frame 9 having holes 8 for positioning with external optical transmission path connector 7, and sealed the chip from the outside to form optical transmission module 100.

The distance between surface emitting element 2 and optical waveguide structure 4 of light-transmitting window 6 is a few tens of microns, and the light emitted by surface emitting element 2 is transmitted with high optical coupling efficiency to optical waveguide structure 4.

Moreover, external optical transmission path connector 7 has a structure for attaching precisely to the frame 9 by means of positioning pins 8' or the like, and also has an optical transmission structure such as optical fiber 7'. Light-transmitting window 6 is mounted in a counterbore in the frame, from which it is separated by spaces 13 for making fine positional adjustments so as to achieve highly efficient optical coupling with the optical transmission structure of external optical transmission path connector 7. Substrate 3 mounting surface emitting optical element 2 is also mounted in a counterbore in the frame, from which it is separated by spaces 14 for making fine positional adjustments, and is attached and fixed after fine positional adjustments to ensure highly efficient optical coupling with external optical transmission path connector 7.

Moreover, wiring pins 5 for electrically connecting a drive circuit to drive the light source or the like project from substrate 3 on the reverse side from the element mounting side, so that the optical transmission module can be assembled on a wiring board.

Figure 2:
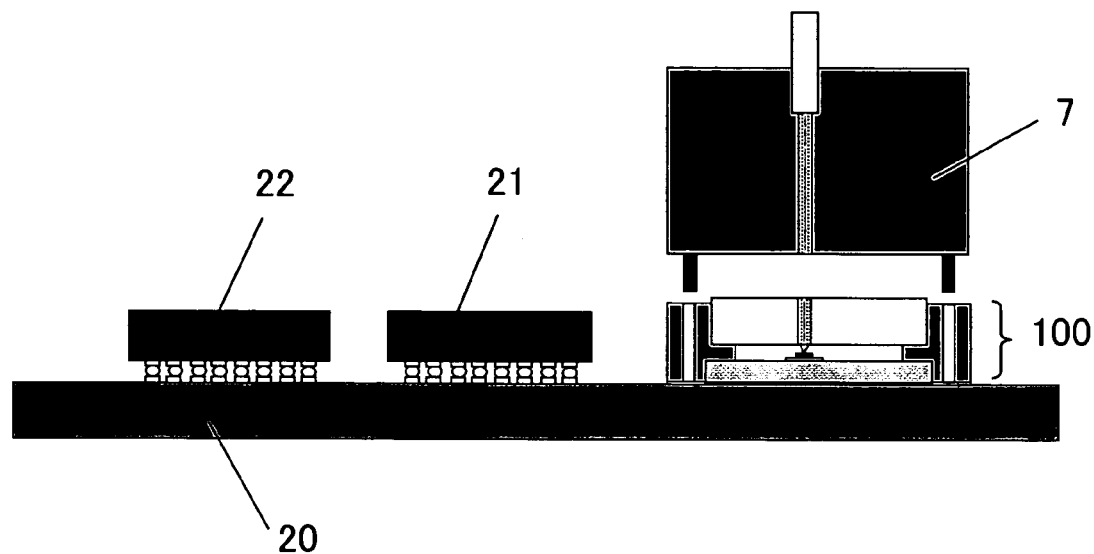
FIG. 2 shows an example of an optical transmission module mounted on an electrical wiring board.

FIG. 2 is an example of an optical transmission module assembled on an electrical wiring board. Two wiring pins 5 shown in FIG. 1 are a wiring pin for driving the optical element and a ground wiring pin, but the number of pins 5 varies depending on the number of optical elements formed on a chip and the number of semiconductor chips with formed optical elements. The optical transmission module is mounted on electrical wiring board 20. Drive circuit 21 for driving the optical element, conversion circuit 22 for serial/parallel conversion and the like are also mounted on the electrical wiring board. External optical transmission path connector 7 can be attached and detached from such an optical transmission module 100 mounted on an electrical wiring board 20.

Figure 3:
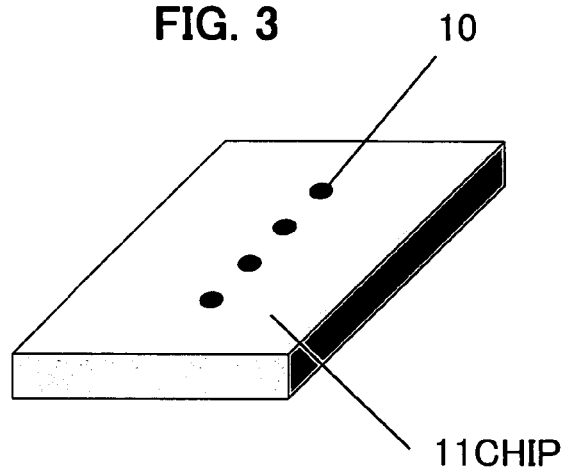
FIG. 3 is a simplified view of an optical element to be mounted on a substrate.

FIG. 3 is a simplified view of optical elements to be mounted on a substrate. In the figure, 10 is a light-emitting or light-receiving element, and the various optical elements 10 are formed in a straight line on semiconductor chip 11 at a specified pitch. This pitch is formed so as to be the same as the pitch of the aforementioned optical waveguide structure of the aforementioned light-transmitting window, and is also formed to be the same as the pitch of the external optical transmission path. In addition, at least one or normally multiple elements are formed on a semiconductor chip. In the present example, the number of elements is 4. The semiconductor chip is mounted on a substrate by conventional wire bonding or the like.

Figure 4:
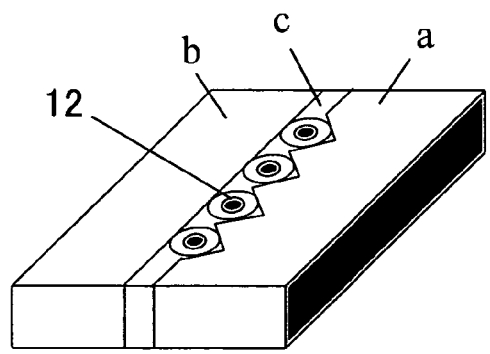
FIG. 4 is a simplified view of an example of a light-transmitting window configuration.

FIG. 4 is a simplified view of an example of a light-transmitting window configuration. In the figure, optical fibers 12, which consist of a core with a high refractive index covered by cladding with a low refractive index, are laid along the grooves of quartz substrate a which is formed with V grooves, and capped by a separate quartz substrate b, with the gaps filled by low-melting-point glass c or the like.

This is then cut out on a plane perpendicular to the longitudinal axis of the optical fibers, and both ends are optically polished to a specified thickness. In this example the materials are a quartz substrate and low-melting-point glass, but a glass substrate or the like could also be used. However, since this light-transmitting window seals the substrate with the mounted optical elements together with the frame, a material with low hygroscopicity is preferably used to protect the optical elements from the effects of external water vapor.

(Embodiment 2)

Figure 5:
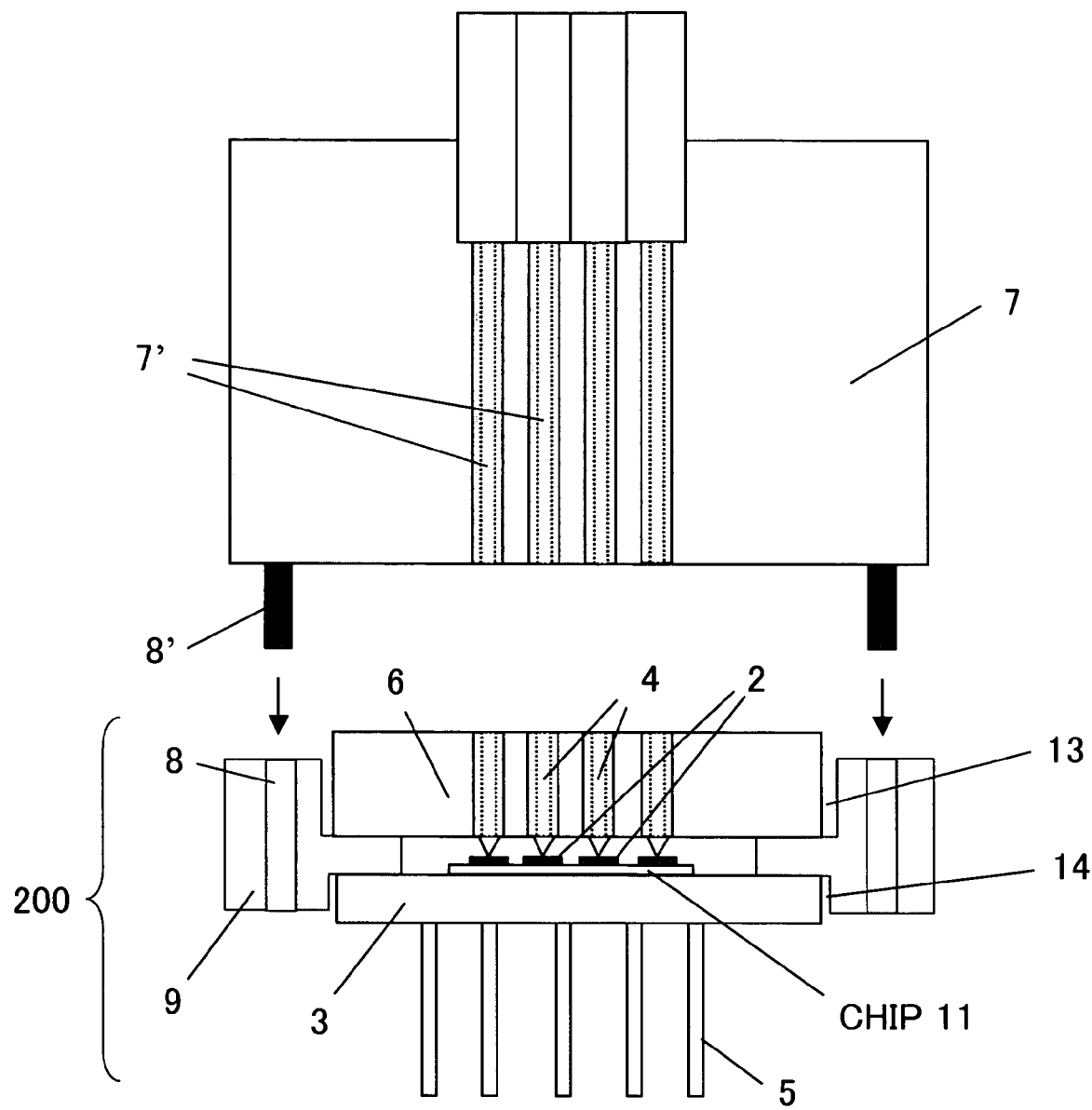
FIG. 5 is a cross-section of an optical transmission module illustrating the second example of the present invention.

FIG. 5 is a cross-section of an optical transmission module illustrating the second embodiment of the present invention. The same numbers are used for those parts which are the same as in Embodiment 1.

Substrate 3 on which is mounted chip 11 having multiple surface emitting elements 2 for example formed as the optical elements and light-transmitting window 6 having embedded optical fibers for example as optical waveguide structures 4 in the direction of light transmission are fixed with a highly airtight adhesive or the like (not shown) on frame 9 having holes 8 for alignment with external optical transmission path connector 7, and sealed from the outside to form optical transmission module 200. This configuration is largely similar to that of Embodiment 1 except that surface emitting optical elements 2 are formed in an array on the chip and the chip 11 with multiple surface emitting elements 2 being formed is mounted on a substrate 3.

Other similarities to Embodiment 1 include the fact that optical transmission path 7 has a structure for coupling precisely with frame 9 by means of positioning pins 8', the fact that light-transmitting window 6 has spaces 13 for making fine positional adjustments so as to achieve highly efficient optical coupling with fibers 7' of optical transmission path 7, and the fact that substrate 3 which carries surface emitting elements 2 also has spaces 14 for making fine positional adjustments, and is attached and fixed after fine positional adjustments to ensure highly efficient optical coupling with fibers 7' of external optical transmission path connector 7.

If a 4×4 array of surface emitting optical elements is arranged on a single chip, if the optical waveguide structure 4 of light-transmitting window 6 consists of optical fibers for example it is arranged in a 4×4 array corresponding to surface emitting optical elements 2. In the same way, the optical fibers 7' of external optical transmission path connector 7 are also arranged in a 4×4 array.

Moreover, because in this embodiment there are four surface emitting optical elements mounted on a chip, at least 4 individual drive wiring pins (one for each surface emitting optical element) and one common ground wiring pin 1 are required, for a total of 5 wiring pins. However, the number may be greater if the ground wiring pins are individualized or if an optical detector or the like (not shown) is included to measure the strength of the light source.

(Embodiment 3)

Figure 6:
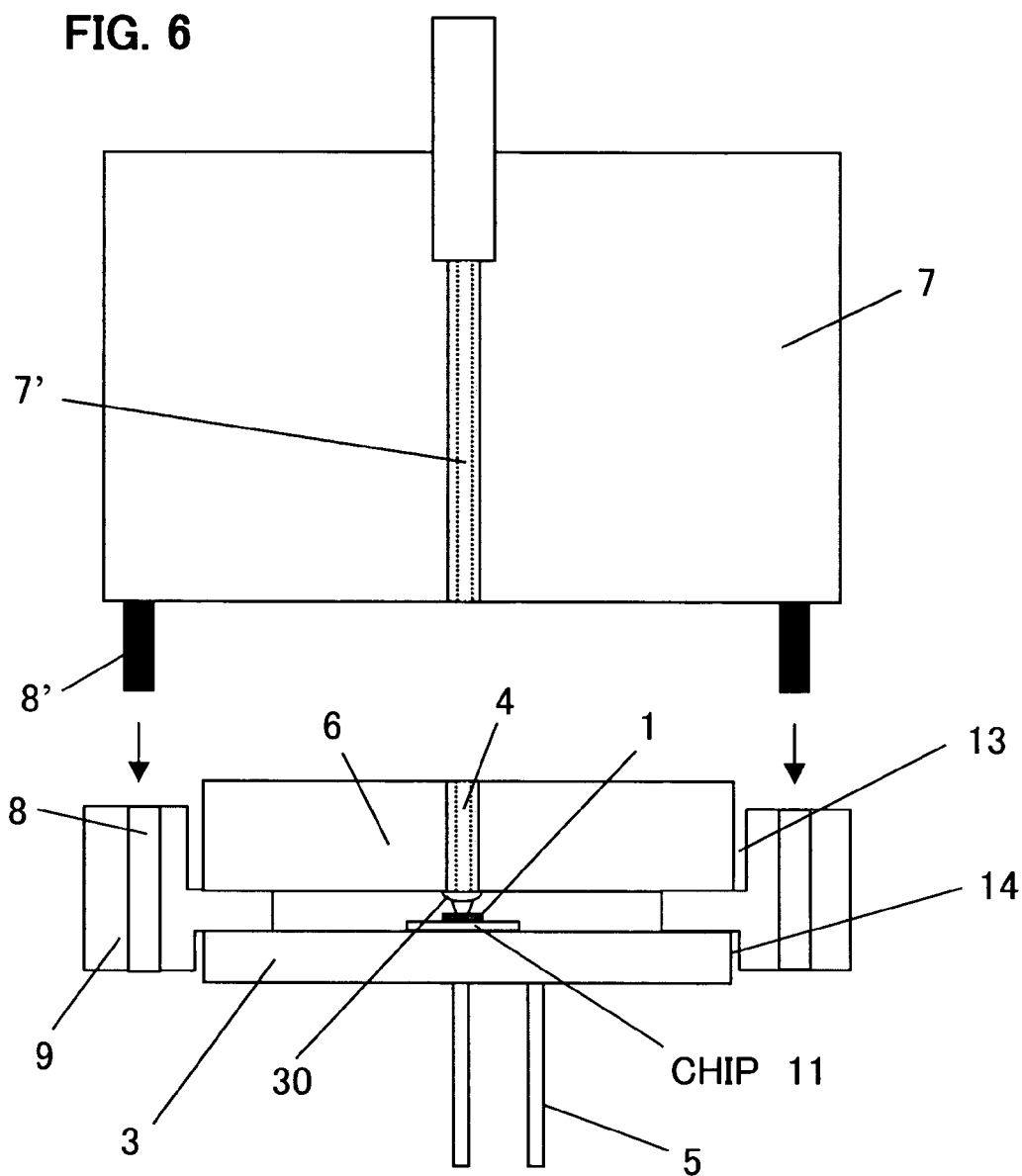
FIG. 6 is a cross-section of an optical transmission module illustrating the third example of the present invention.

FIG. 6 is a cross-section of an optical transmission module illustrating the third embodiment of the present invention. In the figure the same numbers are used for those parts that are the same as in Embodiments 1 and 2. Substrate 3 having a mounted chip on which is formed light-receiving element 1 for detecting light for example as the optical element and light-transmitting window 6 having embedded optical fibers for example as optical waveguide structure 4 in the direction of light transmission are fixed with a highly airtight adhesive or the like (not shown) on frame 9 having positioning holes 8 for alignment with external optical transmission path connector 7, and sealed from the outside to form optical transmission module 300. On a normal chip multiple light-receiving elements are formed as an array, but only one light-receiving element may also be formed.

Other similarities to Embodiments 1 and 2 include the fact that optical transmission path 7 has a structure for coupling precisely with frame 9 by means of positioning pins or the like, the fact that light-transmitting window 6 has spaces 13 for making fine positional adjustments so as to achieve highly efficient optical coupling with fibers 7', and the fact that substrate 3 on which the light-receiving element for detecting light is mounted also has spaces 14 for making fine positional adjustments, and is attached and fixed after fine positional adjustments to ensure highly efficient optical coupling with external optical transmission path connector 7.

Moreover, in this example one light-receiving element is shown as being formed on substrate 3, but as in Embodiment 2 it is also possible to form multiple optical elements on substrate 3.

Figure 7:
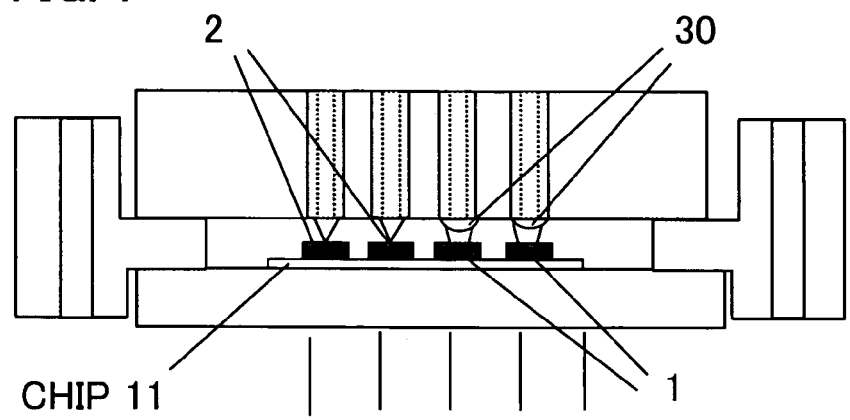
FIG. 7 shows a cross-section of an optical module having light-emitting elements and light-receiving elements mounted on the same substrate.

Moreover, surface emitting optical elements and light-receiving elements can be mixed together as optical elements 1. FIG. 7 shows a cross-section of an optical module having light-emitting elements 2 and light-receiving elements 1 mounted on the same chip. A chip for holding semiconductor lasers or other light-emitting elements 2 and light-detecting semiconductor diodes or other light-receiving elements 1 is mounted on substrate 3, and sealed with a frame and a light-transmitting window having an optical waveguide structure. Normally the light-emitting elements are formed with the same pitch on a chip, while the light-receiving elements are formed with the same pitch on a different chip. If the pitch of the light-emitting elements on the chip is the same as the pitch of the light-receiving elements on the other chip, the various optical elements can be formed as an array by adjusting the arrangement of the chips.

In FIGS. 6 and 7, a lens 30 is formed within the sealed body on the optical waveguide structure of the light-transmitting window, which couples optically with the light-receiving element. Because light entering the light transmitting module from external optical transmission path connector 7 diverges from optical waveguide structure 4 of the light-transmitting window into the interior of the sealed body and is lost, this lens 30 is formed on the sealed body side of waveguide structure 4 to prevent divergence. Forming a microlens 30 allows the light to be focussed, thus making it possible to shrink the area of the light-receiving element, reduce noise and improve response speed.

When forming the light-transmitting window having an optical waveguide structure, this lens 30 is formed on a cross-section of optical fiber which has been cut perpendicularly to a waveguide path corresponding to the light-receiving element, such as the longitudinal direction, and polished to make it flat. A specific method of forming the lens is to blow about one drop per one optical fiber of a liquid ultraviolet hardening resin by ink jet technology or the like, and then expose it to ultraviolet light to harden the resin.

Moreover, when the optical waveguide structure of the light-transmitting window is a multi-mode waveguide path, the shape of the lens does not need to be controlled precisely partly because the lens diameter is smaller, and lens formation can be achieved with good reproducibility by adjusting the viscosity of the ultraviolet hardening resin or other resin.

(Embodiment 4)

Figure 8:
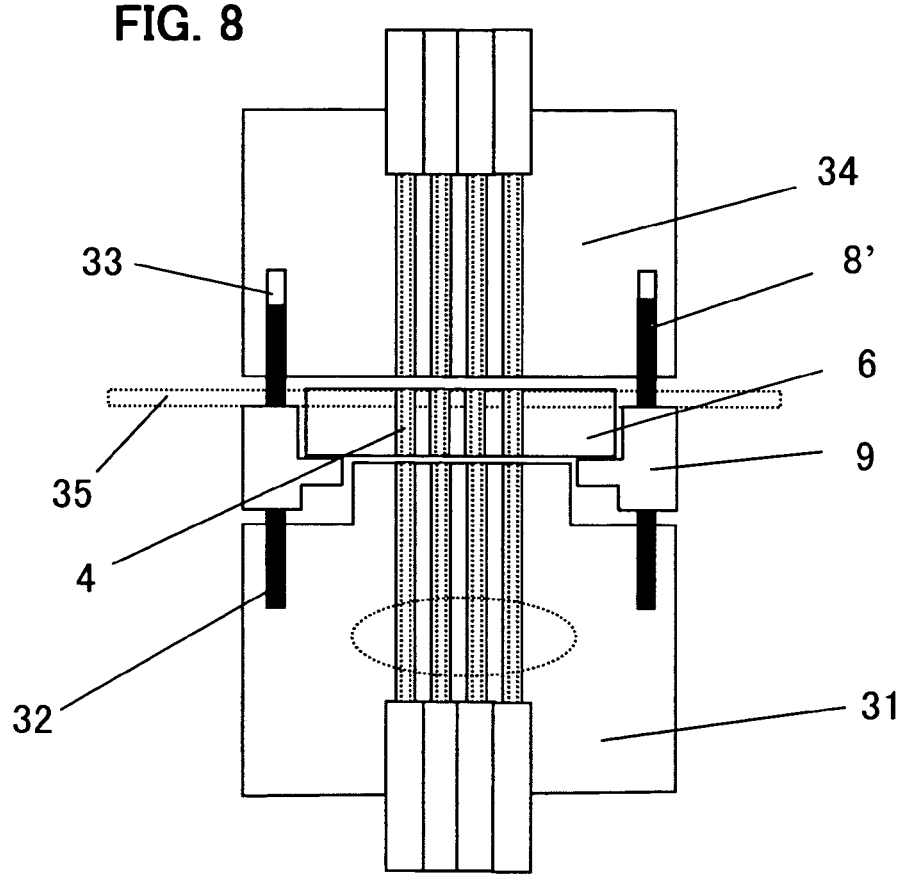
FIG. 8 is a cross-section showing a method of aligning a light-transmitting window having an optical waveguide structure on a frame.

The optical transmission modules described in Embodiments 1 through 3 of the present invention are manufactured by the methods described below. FIG. 8 is a cross-section showing a method of aligning a light-transmitting window having an optical waveguide structure to a frame. The figure illustrates an example of aligning a light-transmitting window 6 having multiple optical waveguide structures 4 formed in an array.

First, optical fiber alignment jig 31 is prepared capable of being inserted up to the point of contact with light-transmitting window 6 from the side on which substrate 3 for holding the optical elements will be fixed on frame 9. This jig consists of optical fibers formed in an array for example, and has holes 32 formed so as to allow precise alignment with the frame 9. Moreover, the optical fibers of this jig are accurately arranged in the identical positions as the optical elements to be mounted on the substrate.

In addition, optical connector jig 34 is prepared having holes 33 which can be precisely aligned with the frame 9 from the side on which the light-transmitting window is to be fixed, and having an optical fiber array arranged in the same way as the external optical transmission path.

Next, positioning pins 8' are inserted into the alignment holes in the frame, and the frame is sandwiched between optical fiber alignment jig 31 and optical connector jig 34. The optical fiber core axes of these two jigs match each other when they are mounted by means of positioning pins 8' passing through the positioning holes in the frame. In this state, light-transmitting window 6 is placed in the position for mounting the light-transmitting window in a counterbore in the frame. The position of light-transmitting window 6 is then adjusted so that light coupled from the outside to optical connector jig 34 passes through optical waveguide structure 4 inside light-transmitting window 6 to couple efficiently with the corresponding optical fibers of optical fiber alignment jig 31. The jig shown by the broken line in FIG. 8 is used for adjustment.

Figure 9:
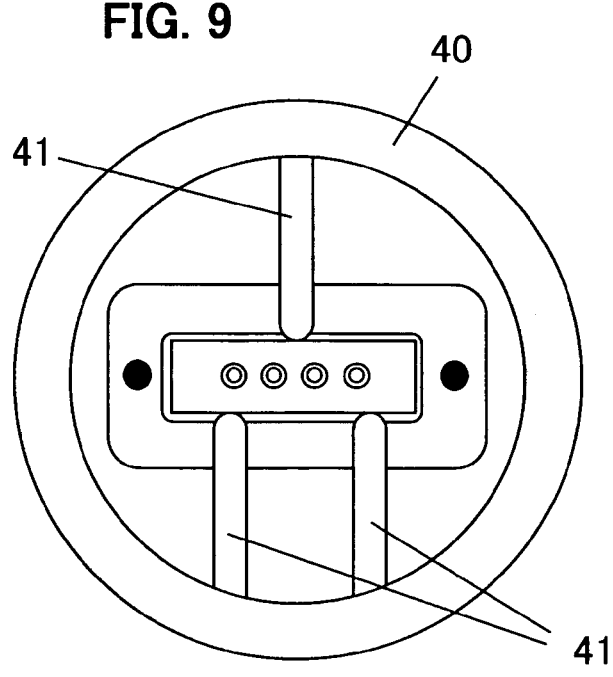
FIG. 9 shows a top view of a jig for adjusting the position of a light-transmitting window.

FIG. 9 is a top view of a jig for adjusting the position of the light-transmitting window. This position-adjusting jig consists of adjustment handle 40 and arms 41, which extend from the handle to touch the light-transmitting window. In this example there are three arms, but there are no particular limits on the number of arms. It is enough that the arms be capable of positioning in a plane, including rotation. By operating the handle of this position-adjusting jig, the position of light-transmitting window 6 is moved slightly within the allowable range of space 13, and adjusted and fixed so as to maximize the strength of light obtained from optical fiber alignment jig 31. The adhesive used for fixing is one having sufficient environmental resistance against humidity and temperature changes to seal the optical element. Next, alignment of the substrate for mounting the semiconductor chips is explained.

Figure 10:
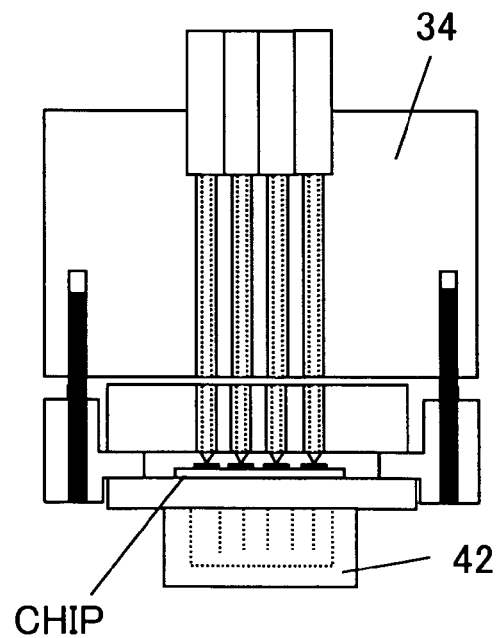
FIG. 10 shows how a substrate with an optical element mounted on a frame is aligned with an external optical transmission path.

FIG. 10 shows how a substrate with mounted optical elements is aligned on frame 9 with an external optical transmission path. An external optical connector jig 34 having an ordered optical fiber array is mounted on the frame by passing positioning pins 8' through positioning holes in the frame. Since the optical connector jig has already been aligned with the light-transmitting window, when the elements are light-emitting elements they are temporarily made to emit light and slightly moved and aligned within the allowable range of space 14 so as to maximize the strength of light detected from optical connector jig 34. At the same time jig 42 is subjected to vacuum suction or the like for example using a stage or the like (not shown) capable of performing alignment in a plane, including rotation. The broken lines in the figure indicate connection pins of the light transmission module. Once alignment with the optical connector is completed, the substrate is sealed and fixed using an environmentally resistant adhesive in the same way as the light-transmitting window.

In the example explained above the optical element is a light-emitting element, but roughly the same applies to a light-receiving element. An external optical connector jig having an ordered optical fiber array is mounted on the frame by means of alignment pins. Since the light-transmitting window and optical connector jig have already been aligned, when the element is a light-receiving element it is finely moved within the allowable range of space 14 and aligned so that the incoming light from an externally arrayed optical fiber array is at maximum strength when detected by the light-receiving element. The alignment jig can be the same as for a light-emitting element.

Figure 11:
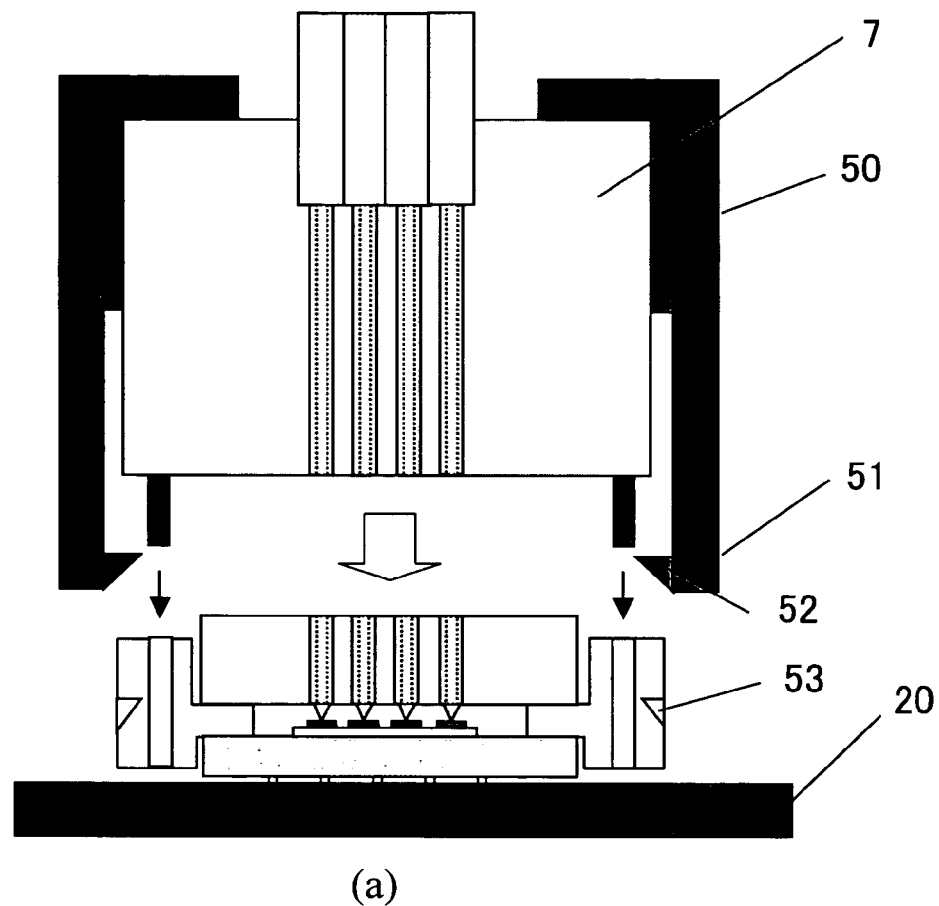
FIG. 11 shows how an actual optical transmission path is connected to an optical transmission module.
Figure 11:
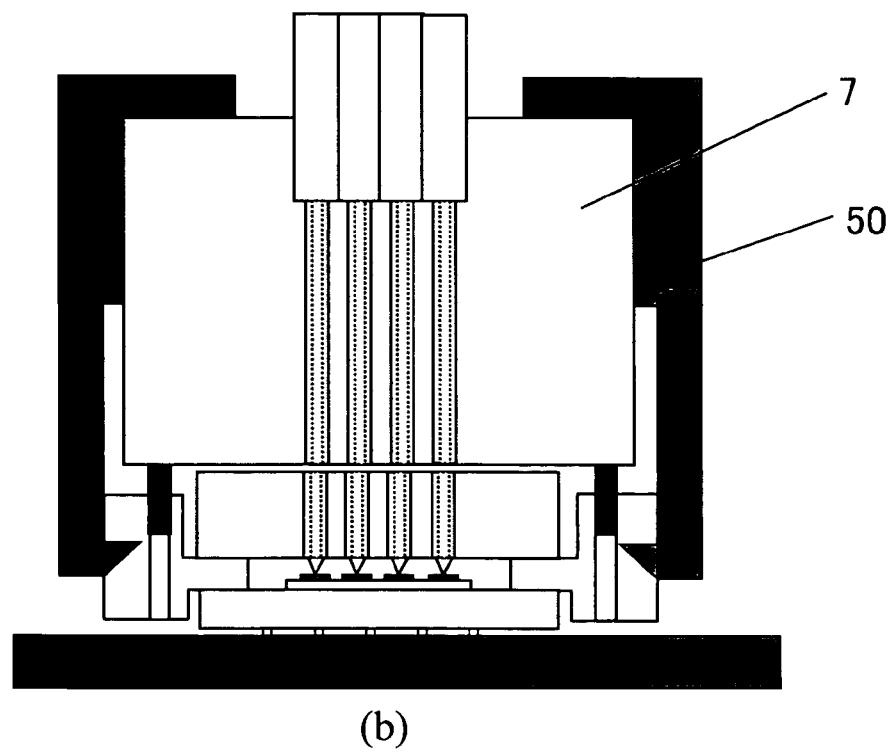

As explained in the first embodiment of the present invention, the optical transmission module formed by the above steps is mounted on an electrical wiring board. For purposes of actual use the optical transmission module needs to be connected to an external optical transmission path. FIG. 11 shows how an optical transmission path is actually connected to an optical transmission module.

FIG. 11(a) shows the external transmission path connector 7 covered by connector case 50 for fixing purposes. Connector case 50 has lock mechanisms 51 and claws 52, while the optical transmission module has grooves 53 which match the connector case. Next, when pressure is applied from above to connector case 50 as shown in FIG. 11(b) lock mechanisms 51 bend and claws 52 are engaged and fixed in grooves 53 in the frame. Because the external transmission path is fixed precisely in the frame by its alignment pins, the optical elements couple optically with high efficiency with the external transmission path.

In this structure, when the light-transmitting window becomes dirty due to accumulation of dust from the air or the like, it is possible to release the lock mechanism of the connector case and clean the dirty light-transmitting window. However, the connection between the external optical transmission path and optical transmission module is not limited by this example. They may be attached after positioning of the external optical transmission path with connection pins, or covered so that dust and the like will not enter after attachment.

INDUSTRIAL APPLICABILITY

Thus, with the present invention it is possible to provide an optical transmission module which permits highly efficient optical coupling between an optical element and an external optical transmission means, wherein the alignment therefor is easy and the external optical transmission means can be easily attached and detached.

What is claimed is:

1. An optical transmission module for data communication by optical signals with an external optical transmission path comprising:
   a positioning structure with a structure for determining an alignment with said external optical transmission path;
   a substrate for mounting an optical element; and
   a light-transmitting window located between said positioning structure and said external optical transmission path and having an optical waveguide structure corresponding to said external optical transmission path and to said optical element in a direction of light transmission,
   wherein said positioning structure has a substrate mounting part for mounting said substrate and a light-transmitting window mounting part for mounting said light-transmitting window, as well as structures of slightly moving the substrate mounted on said substrate mounting part and the light-transmitting window mounted on said light-transmitting window mounting part so as to adjust the positions thereof relative to the external optical transmission path; and wherein said optical element is sealed in between said substrate, said light-transmitting window and said positioning structure by fixing said substrate and said light-transmitting window to said positioning structure.

2. An optical transmission module according to claim 1 wherein said positioning structure has an alignment pin or alignment hole which couples with an alignment hole or alignment pin in said external optical transmission path.

3. An optical transmission module according to claim 1 wherein said positioning structure has a second alignment hole which couples with the first alignment hole provided in said external optical transmission path by means of a pin.

4. An optical transmission module according to claim 1, wherein said light-transmitting window mounting part or said substrate mounting part of said positioning structure has a counterbore, and said substrate or light-transmitting window is mounted in said counterbore to be spaced apart from an inner wall of said counterbore so that a position of said substrate or light-transmitting window can be adjusted relative to said external optical transmission path.

5. An optical transmission module according to claim 1 wherein said optical element is a light-emitting element, a light-receiving element or both.

6. An optical transmission module according to claim 1 wherein one or more chips on which are formed a plurality of optical elements are mounted on said substrate.

7. An optical transmission module according to claim 1, wherein said optical element comprises a light-receiving element and a lens is formed on the optical element side of said optical waveguide structure which corresponds to said light-receiving element.

8. An optical transmission module according to claim 1, further comprising a fixing structure for detachably fixing the external optical transmission path to said positioning structure.

9. A method for manufacturing an optical transmission module whereby at least an optical element held on a substrate is sealed in by a positioning structure, the substrate itself and a light-transmitting window having an optical waveguide structure, said method comprising:

a first step of aligning and fixing said light-transmitting window to said positioning structure so that said optical waveguide structure of said light-transmitting window couples optically with an external optical transmission path; and a second step of aligning and fixing the substrate holding said optical element to said positioning structure so that said optical element couples optically with said external optical transmission path via said optical waveguide structure of said light-transmitting window.

10. A method for manufacturing an optical transmission module according to claim 9, wherein said optical element is a light-emitting element and said second step is performed so as to maximize the strength of the light obtained through said external optical transmission path.

11. A method for manufacturing an optical transmission module according to claim 9, wherein said optical element is a light-receiving element and said second step is performed so as to maximize the strength of incoming light which is received by said light-receiving element from said external optical transmission path.

12. An optical transmission module according to claim 1, wherein said optical waveguide structure is an optical fiber.

* * * * *